Feb. 8, 1944. W. D. KIMBALL ET AL 2,340,883
BAG HANDLING MACHINE
Filed July 31, 1939 10 Sheets-Sheet 7
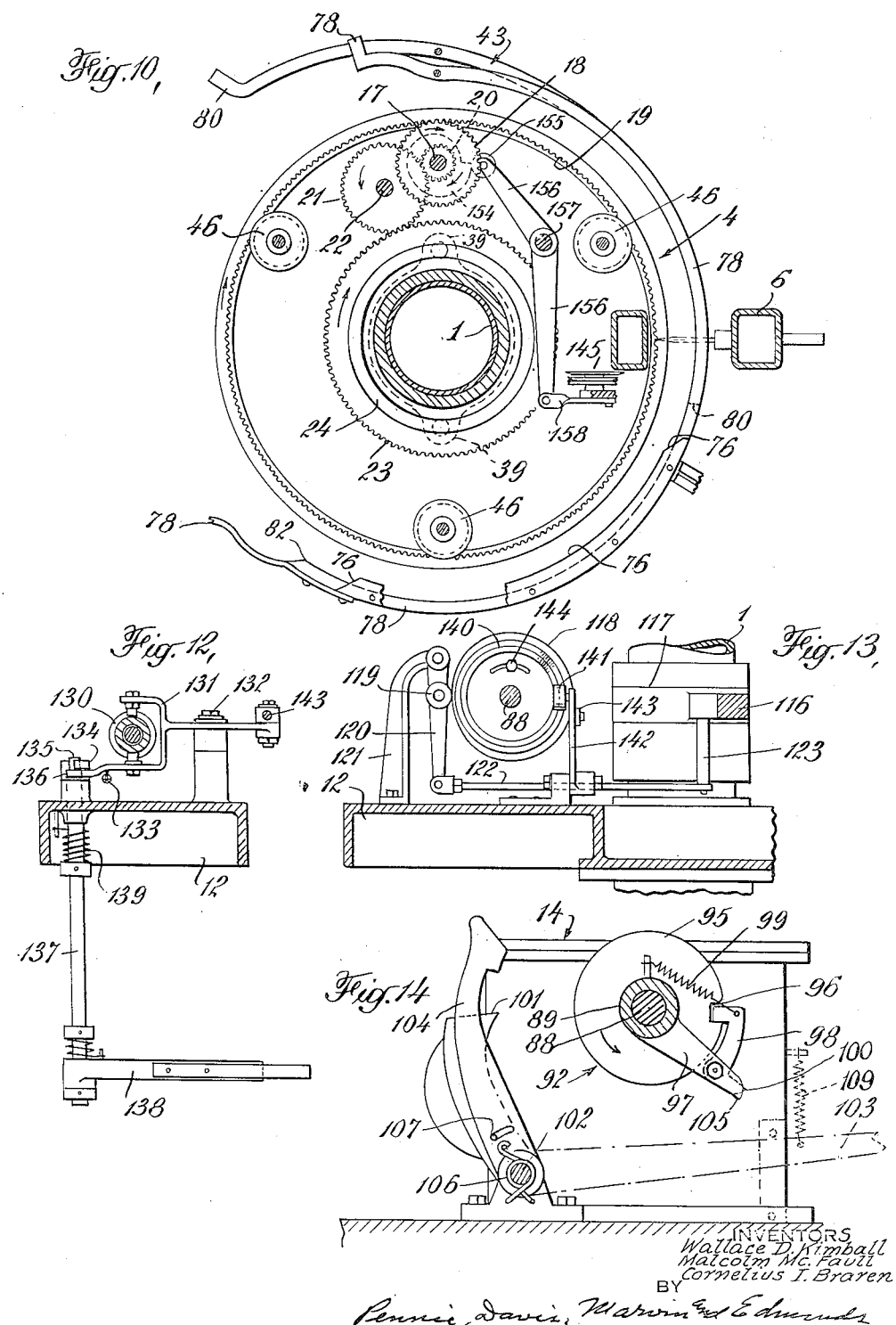
INVENTORS
Wallace D. Kimball
Malcolm McFaull
Cornelius T. Braren
BY
Pennie, Davis, Marvin and Edmunds
THEIR ATTORNEYS

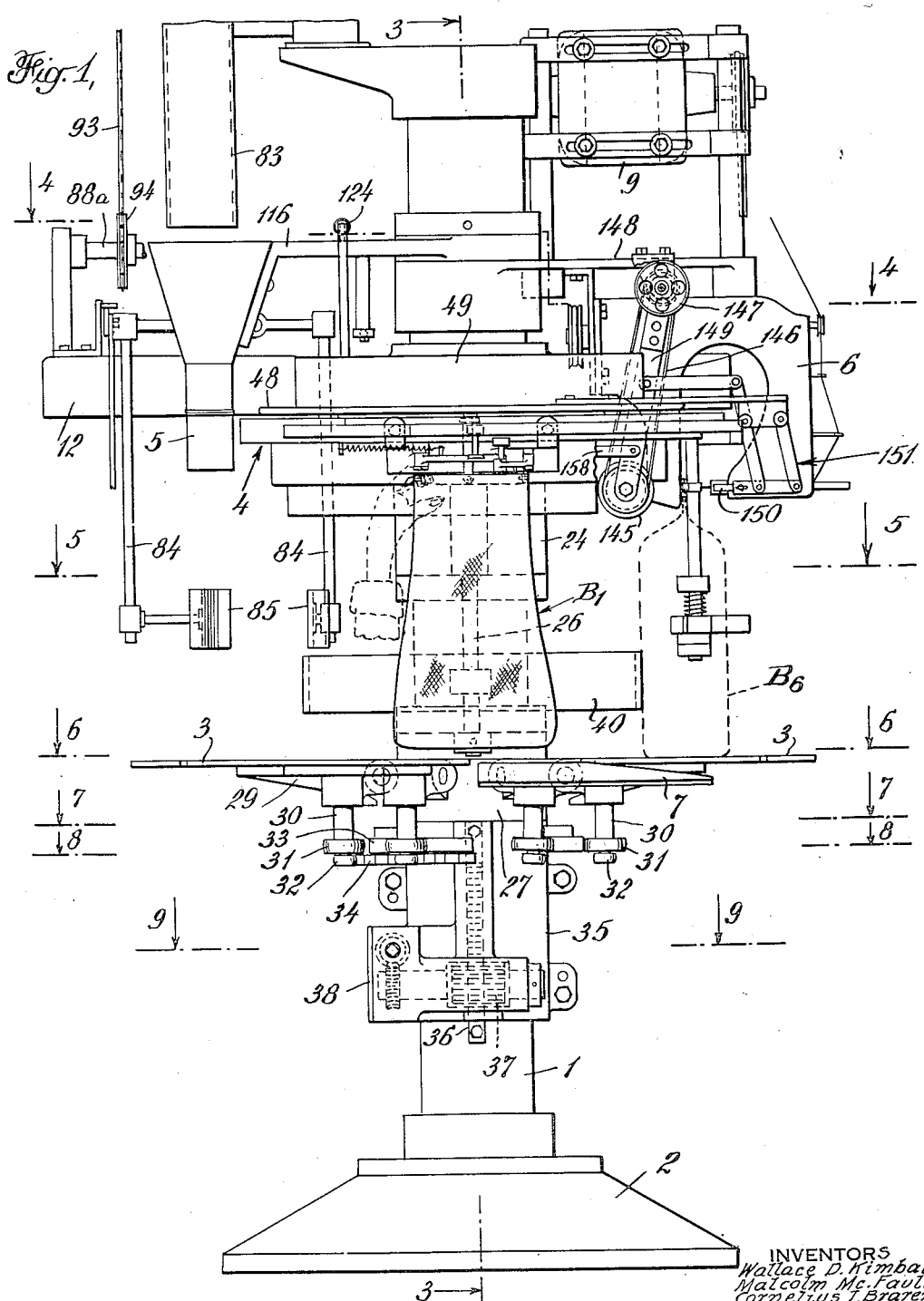

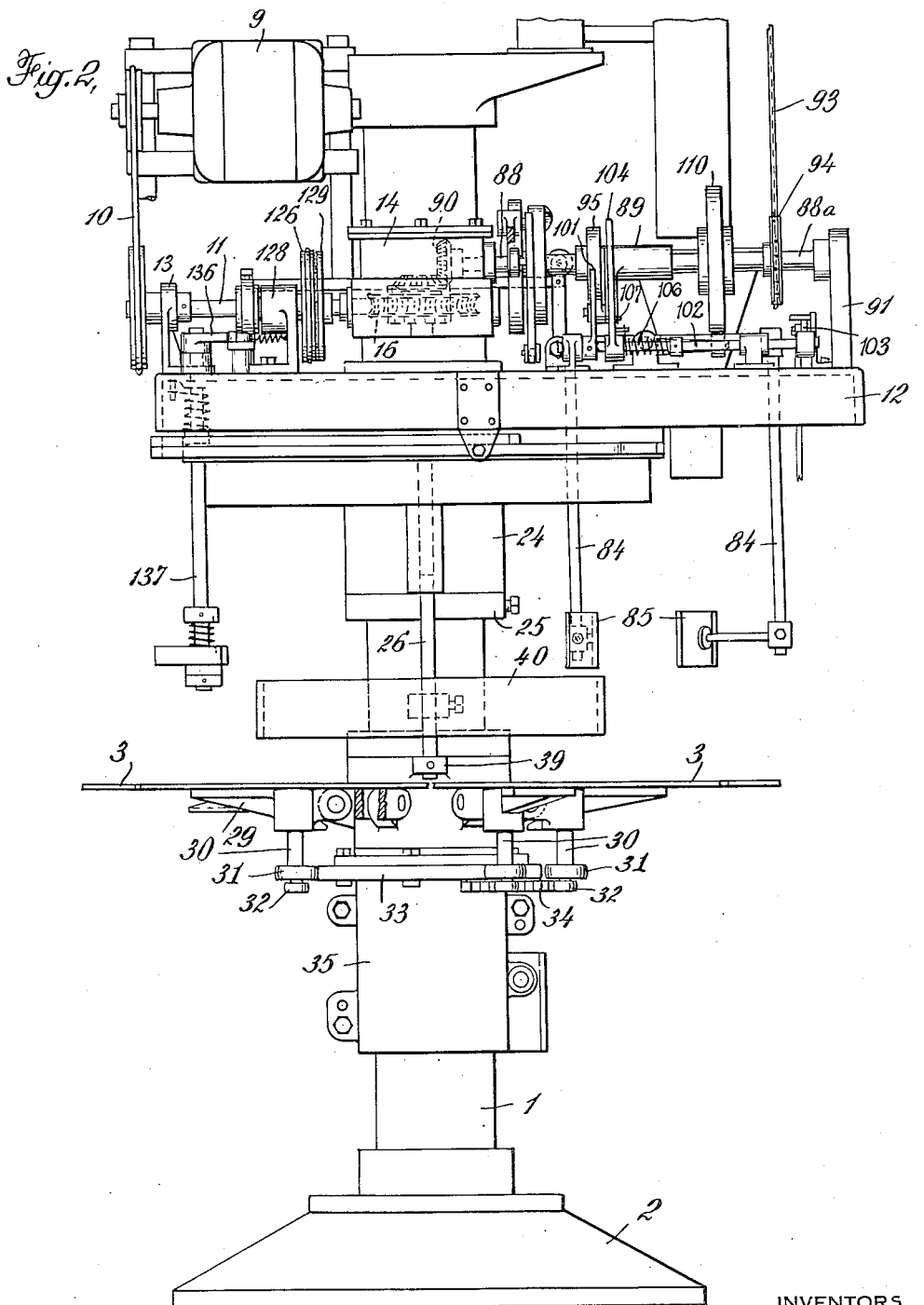

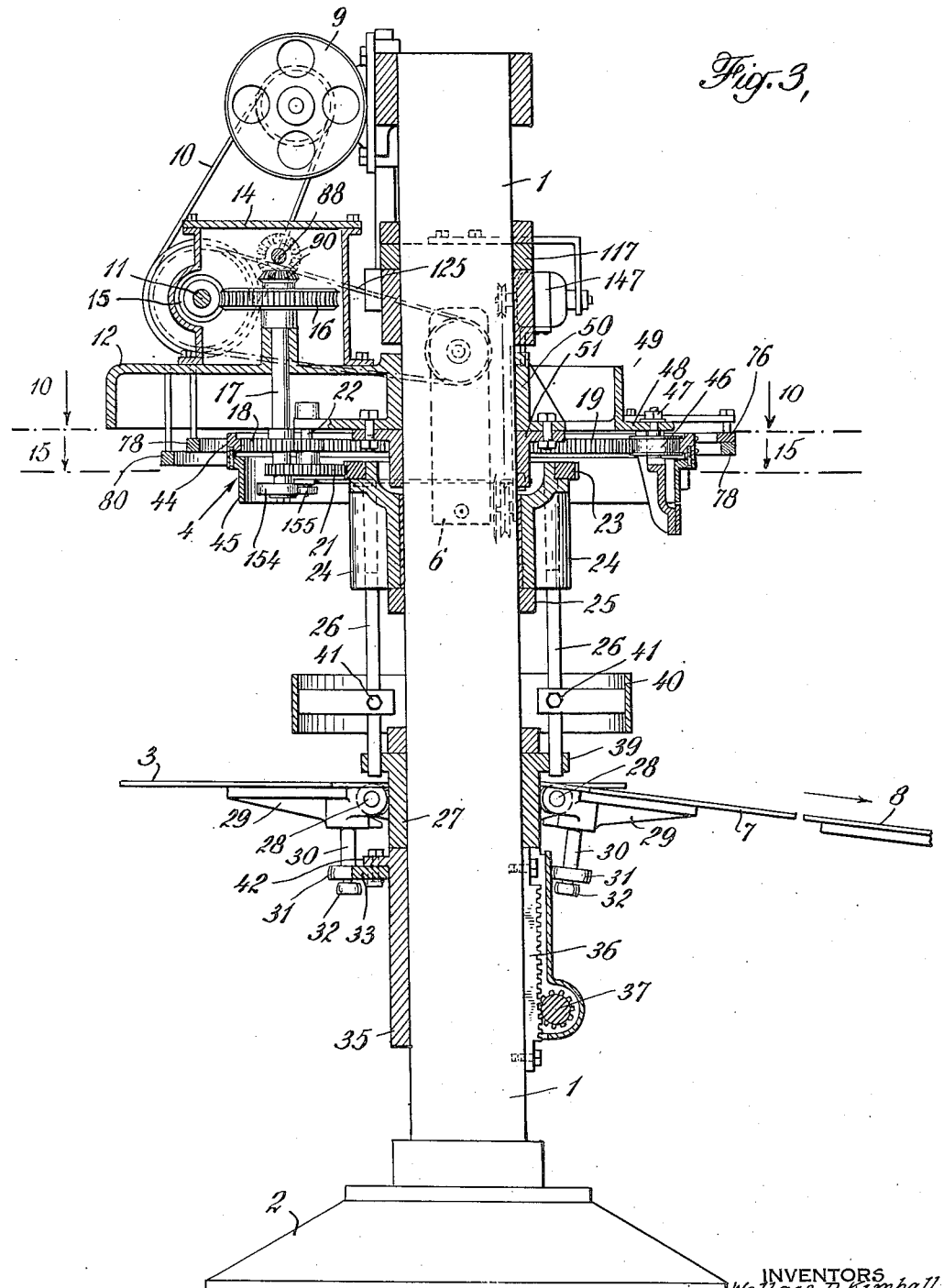

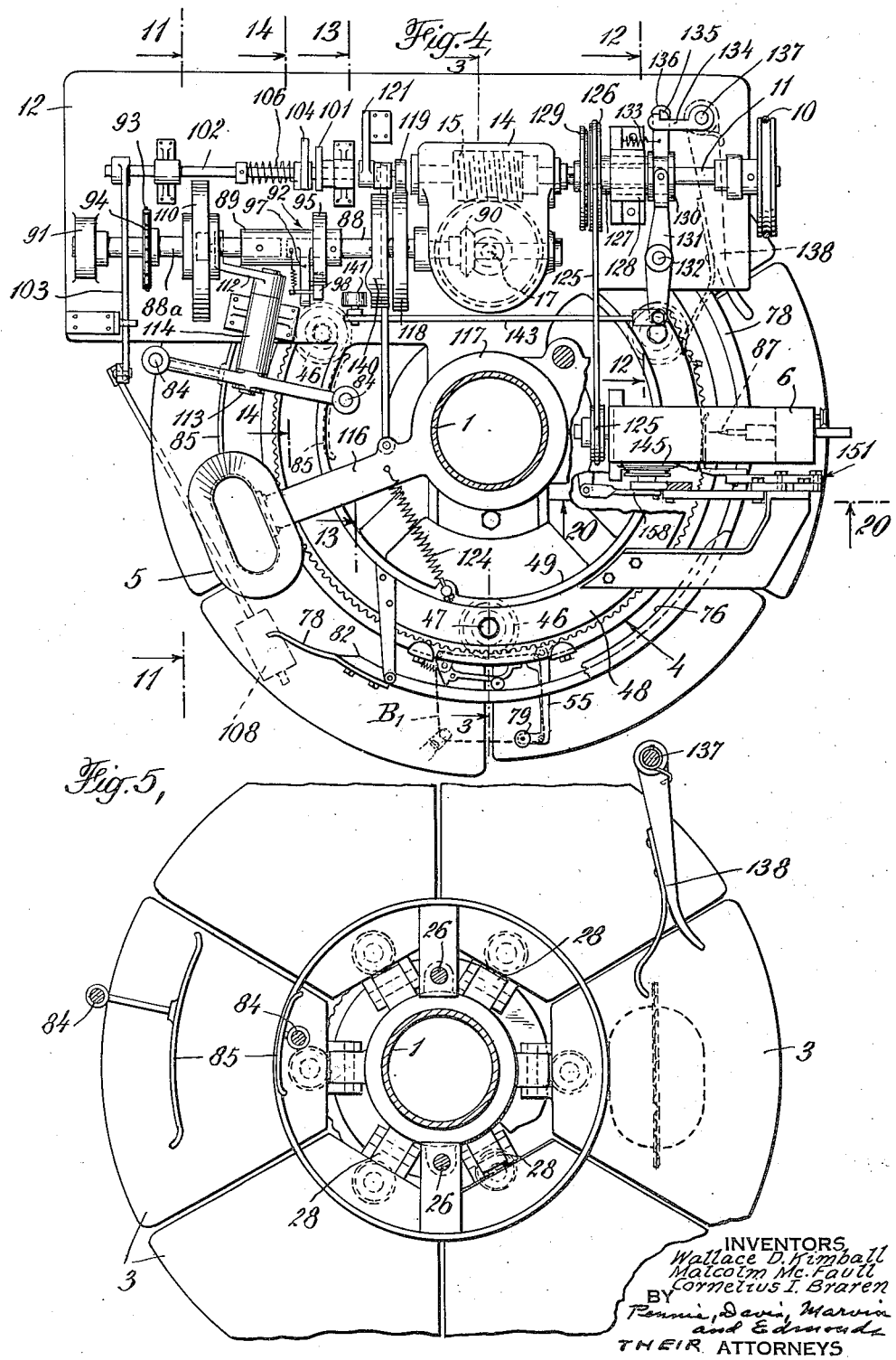

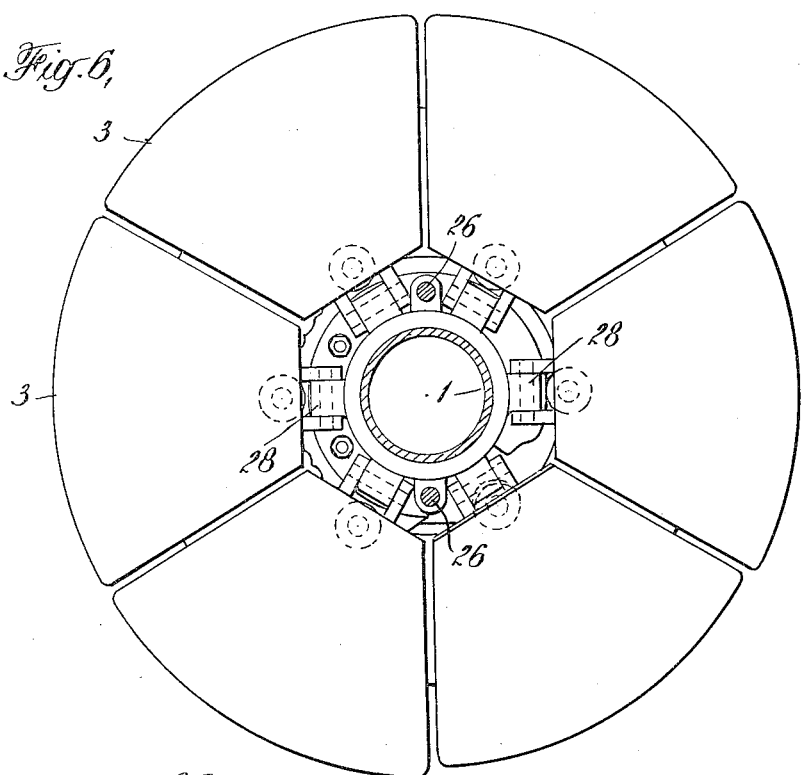
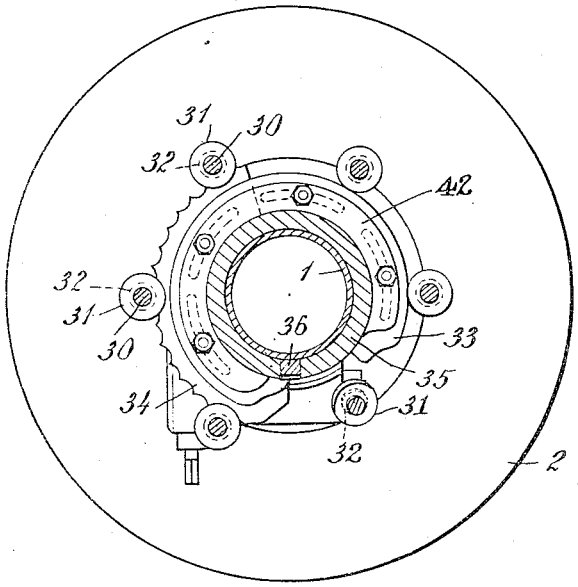
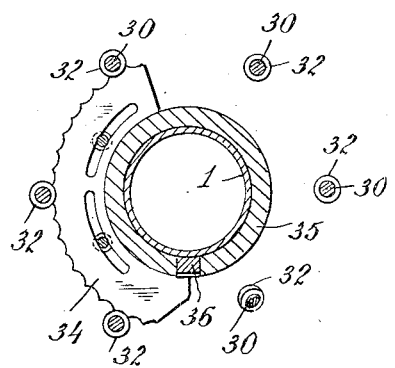

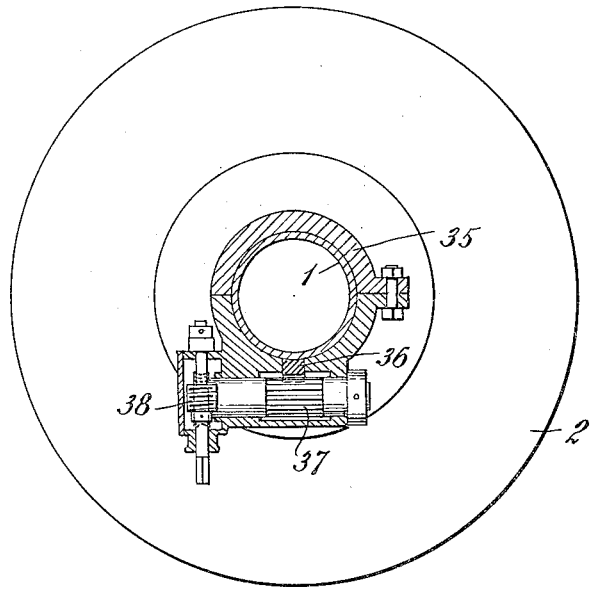
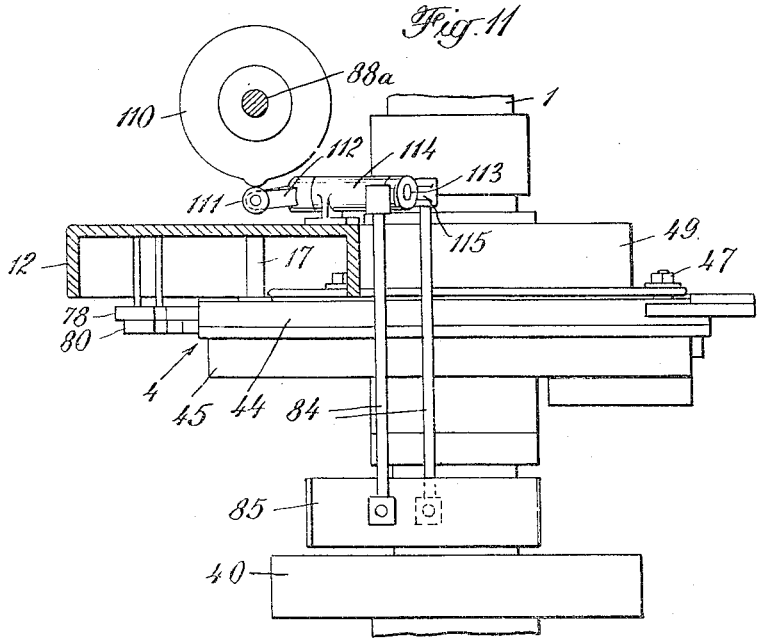

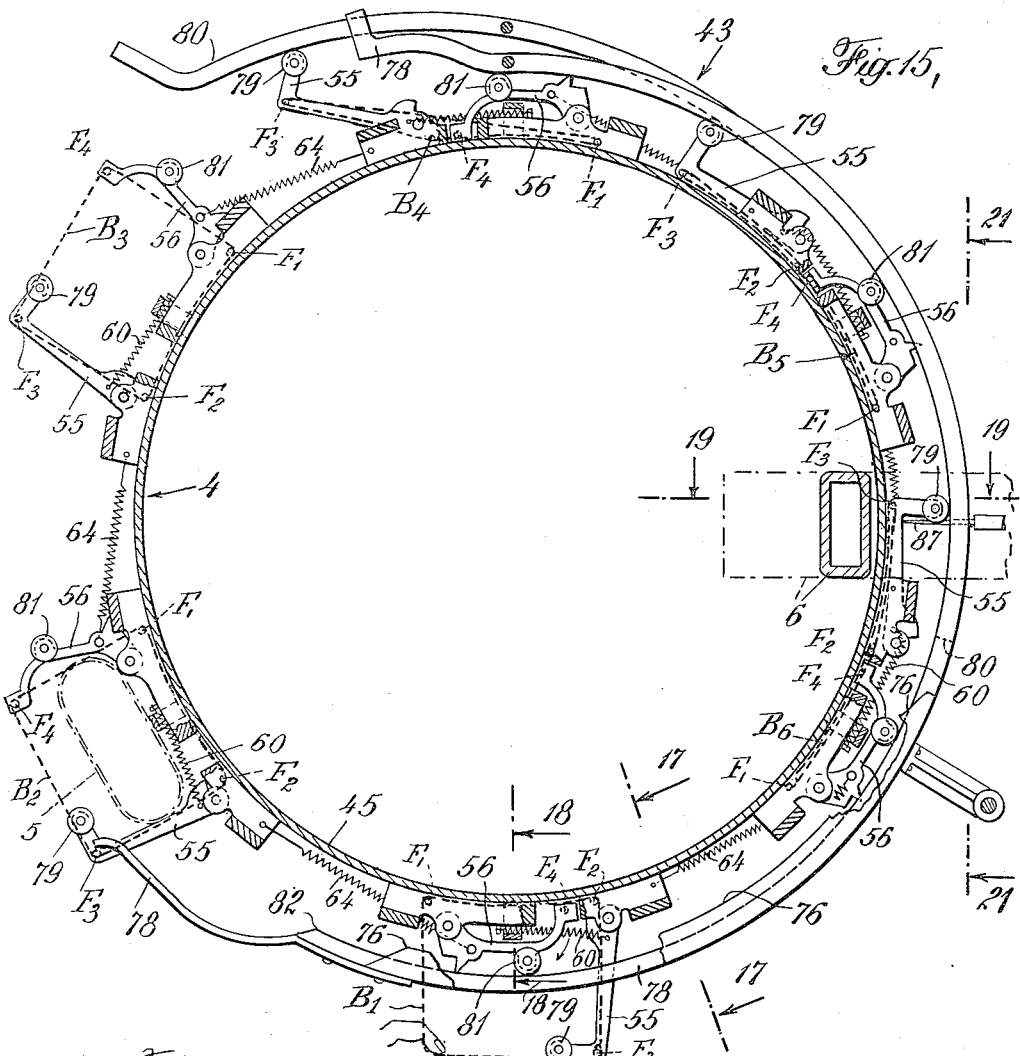
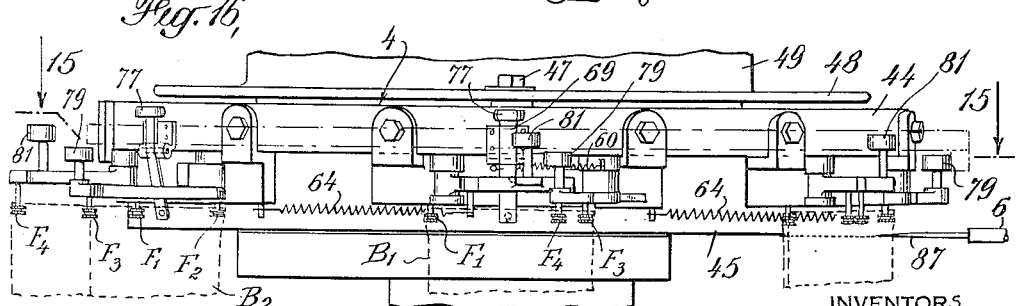

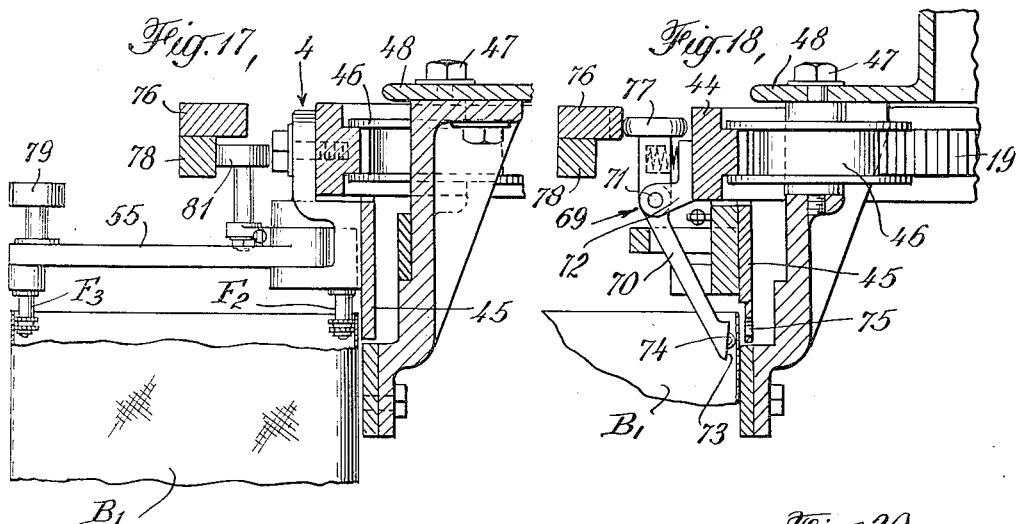
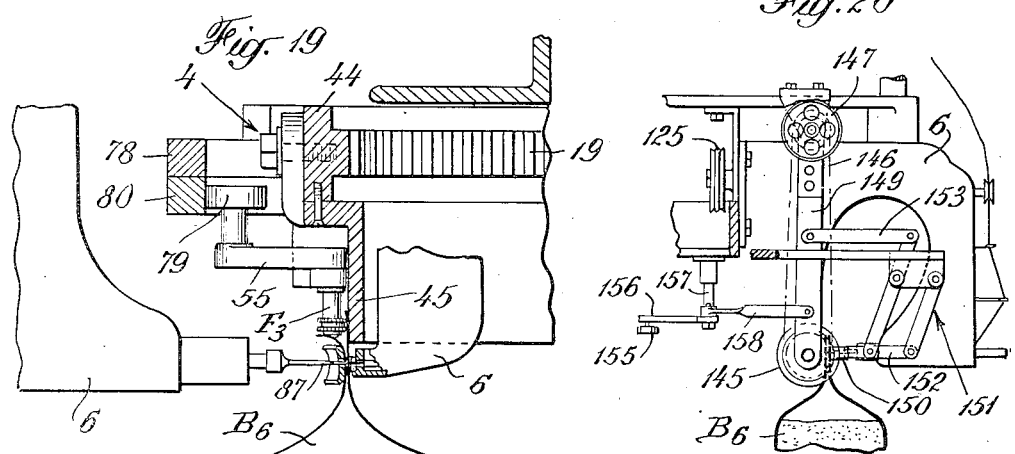
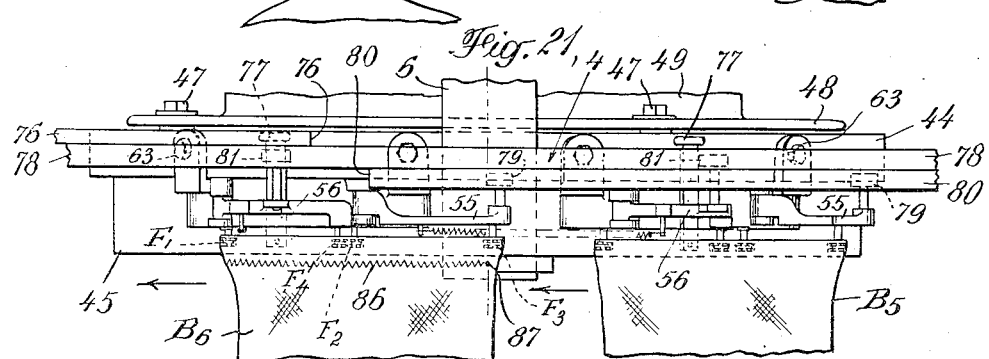

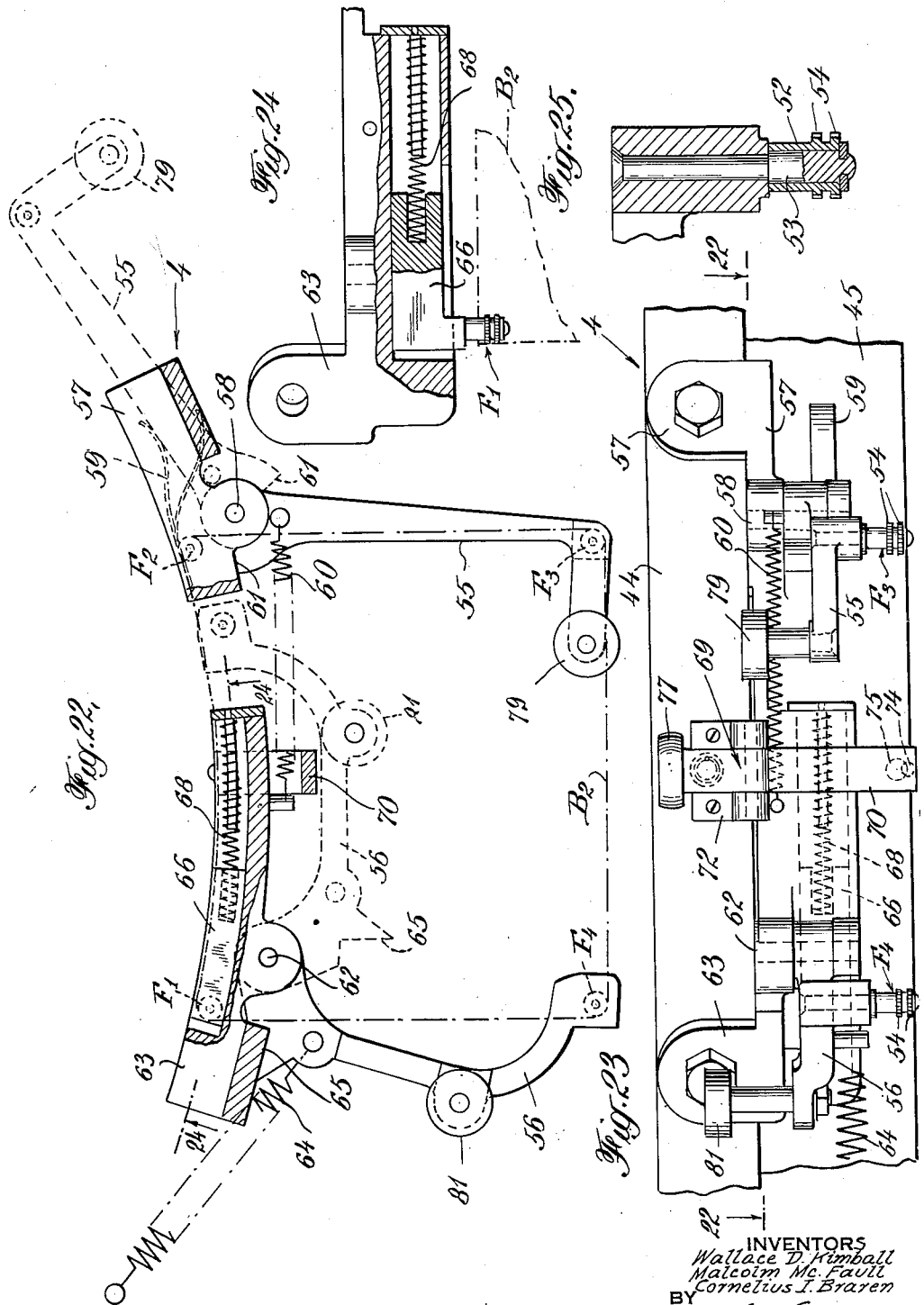

Patented Feb. 8, 1944

2,340,883

UNITED STATES PATENT OFFICE 2,340,883

BAG-HANDLING MACHINE

Wallace D. Kimball and Malcolm McFaull, Jackson Heights, and Cornelius I. Braren, Jamaica, N. Y.

Application July 31, 1939, Serial No. 287,526

16 Claims. (Cl. 226—47)

This invention relates to machines for handling bags such as are used for packaging sugar, salt, flour and other products, and, more particularly, to machines for receiving such bags in partially opened condition, opening them, holding and supporting them in open position while they are being filled and then closing the mouths of the bags and stitching them closed.

The primary object of the invention is to provide such a machine of improved construction which will operate week in and week out substantially without attention other than that given to it by the operator of the machine in placing the bags in position in the machine.

Another object of the invention is to provide such a machine which is semi-automatic in operation; that is to say, which is adapted to have the individual bags attached to it by the operator, but which performs the operations of opening, filling, closing, stitching and delivering the bags without any further attention by the operator.

The invention will be understood from a consideration of the accompanying drawings which illustrate by way of example one embodiment of our invention in a machine which is intended primarily for handling sugar bags. In these drawings:

Fig. 1 is a front elevation of our improved machine with certain parts omitted for the sake of clearness;

Fig. 2 is a similar rear elevation;

Fig. 3 is a vertical central section taken on line 3—3 of Fig. 1;

Fig. 4 is a horizontal section taken on line 4—4 of Fig. 1, the front of the machine, where the operator stands, being towards the bottom of the figure.

Figs. 5 and 6 are horizontal sections taken respectively on line 5—5 and 6—6 of Fig. 1 showing the segmental bag supporting platform;

Fig. 7 is a horizontal section taken on line 7—7 of Fig. 1 showing the cams for actuating the platform segments to jolt the bags and to discharge them from the machine;

Fig. 8 is a horizontal section taken on line 8—8 of Fig. 1;

Fig. 9 is a horizontal section taken on line 9—9 of Fig. 1;

Fig. 10 is a horizontal section taken on line 10—10 of Fig. 3 showing the driving gearing;

Fig. 11 is a vertical section taken on line 11—11 of Fig. 4 showing the bag-shaking mechanism;

Fig. 12 is a vertical section on line 12—12 of Fig. 4 showing part of the sewing mechanism control;

Fig. 13 is a vertical section on line 13—13 of Fig. 4 showing the sewing mechanism stopping cam and cam for moving the filling spout;

Fig. 14 is a vertical section taken on line 14—14 of Fig. 4 showing the one-revolution clutch for controlling the operation of the bag-filling mechanism (not shown);

Figs. 15 and 16 are views drawn to an enlarged scale of the mechanism for manipulating the mouths of the bags, Fig. 15 being a horizontal section taken on line 15—15 of Fig. 16 and also of Fig. 3, and Fig. 16 being a front elevation of the mouth-manipulating mechanism;

Figs. 17-25 are detailed views drawn to a still larger scale;

Fig. 17 is a vertical section on line 17—17 of Fig. 15;

Fig. 18 is a similar section on line 18—18 of Fig. 15;

Fig. 19 is a similar section on line 19—19 of Fig. 15;

Fig. 20 is a similar section on line 20—20 of Fig. 4 showing the sewing and thread-cutting mechanism;

Fig. 21 is a fragmentary side elevation of the bag mouth manipulating mechanism shown in Figs. 15 and 16 and looking from the right hand of those figures partly in section on line 21—21 of Fig. 15, and showing the position of the line of stitching;

Figs. 22 and 23 are views drawn to greatly enlarged scale showing the bag mouth holding mechanism for one bag in fully extended position, as during the filling operation, Fig. 22 being a horizontal section on line 22—22 of Fig. 23;

Fig. 24 is a detail vertical section taken on line 24—24 of Fig. 22; and

Fig. 25 is a greatly enlarged section of a bag-holding finger showing a gripping roller in sectional view.

Referring now to these drawings, the machine of the present invention is supported upon a single vertical cylindrical column 1 which extends upwardly from a base member 2. The machine comprises in general a bag-supporting platform 3 made up of a plurality of segmental sections, as illustrated in Figs. 5 and 6, and a rotary frame designated generally by numeral 4, together with bag-filling mechanism including a filling hopper and spout 5 and sewing mechanism 6.

The platform 3 serves to support the bottoms of the bags after they are filled with sugar from filling spout 5. The rotary frame 4 is provided with devices for holding and manipulating the mouths of the bags during filling and also during a jolting and shaking operation which takes place at the time of filling and shortly thereafter for the purpose of packing the sugar into each bag so as to leave the upper portion of the bag free to enable its opposite sides to be brought into contact with one another and sewed together. After the sewing operation is completed, the mouth of the bag is released by its manipulating mechanism and the platform segment upon which the bag rests is tilted as shown at 7 in Figs. 1 and 3, causing the completed package to slide off onto a conveyor 8 shown at the right of Fig. 3.

The machine is driven by a motor 9 mounted on a bracket at the top of column 1, which, through a belt 10, drives a main shaft 11 which extends horizontally about half way across a rectangular platform 12 (Figs. 4 and 2). This platform is rigidly fixed in position upon column 1, and shaft 11 is supported thereon by means of a journal bearing 13 and a worm gear housing 14. The worm 15 within this housing on shaft 11 drives worm gear 16 which is fixed upon a vertical shaft 17.

It is necessary that the rotary frame with its bag mouth manipulating devices and the rotary platform 3 for supporting the bottoms of the bags be rotated in the same direction and at exactly the same speed, and the gearing shown in side view in Fig. 3 and in plan view in Fig. 10 is provided for this purpose. The lower end of vertical shaft 17 carries a small gear 18 which meshes with an internal gear 19 on the rotary frame 4 to drive the same in the clockwise direction, as shown by the arrow in Fig. 10. Also on shaft 17 is a pinion 20 which meshes with a gear 21 on a short parallel shaft 22 and this gear 21 drives a large gear 23 which is mounted at the top of a sleeve 24 which is arranged to rotate on column 1 and is supported in appropriate horizontal position by means of a collar 25. The gearing 20, 21, 23 is arranged to drive rotary frame 4 and sleeve 24 at the same angular velocity and in the same direction.

Extending downwardly from collar 24 are two vertical driving rods 26 for the rotary segmental platform or table 3 which is constructed as follows:

Each of the segments, 6 in number in the machine shown in the drawings by way of example, is pivoted to a supporting sleeve 27, which snugly surrounds column 1 but is slidable vertically thereon, by means of hinged joints 28 formed by suitable lugs on the supporting sleeve and on brackets 29, respectively, these lugs having the usual hinge pins passing through them. The platform segments are maintained in horizontal position, moved up and down for the purpose of jolting and packing the sugar in the bags, or tilted to the position shown at 7, for discharging the filled bags, by means of rollers at the lower ends of short vertical studs 30 which project downwardly from brackets 29. Each of studs 30 is provided with two rollers 31 and 32. Rollers 31 cooperate with a supporting cam member 33, and rollers 32 with a jolting cam member 34 (Figs. 7 and 8).

The supporting sleeve 27 for the bag-supporting segmental platform 3 is held in any desired vertical position on column 1 by means of an adjustable sleeve 35. This sleeve is adjusted in position and held in its adjusted position by means of a rack 36 bolted to column 1, pinion 37 and the worm and gear mechanism 38 shown in Fig. 1. Hence by applying a wrench to the worm shaft of this mechanism 38, bag platform 3 can be adjusted to any desired vertical position with respect to the rotary frame 4 to suit the height of bag which it is desired for the machine to handle.

It will be understood that supporting sleeve 27 for platform 3 rotates freely on the upper surface of adjusting sleeve 35. The driving rods 26 for rotating the platform are slidably received in a pair of lugs 39 (Figs. 3 and 10). Carried also by driving rods 26 is a circular positioning ring and guard member 40 which serves to position the bags in upright condition, as shown in Fig. 1, in dotted lines after they have been filled. This guard member may be adjusted vertically on rods 26 by means of the set screws 41.

As shown in Figs. 7 and 8, the supporting cam 33 and jolting cam 34 are each angularly adjustable about the axis of column 1. For this purpose they are mounted by means of the bolt and slot connections illustrated in these figures upon a flange 42 which projects outwardly from adjusting sleeve 35. By this means the timing of the commencement of the period of jolting can be adjusted as desired with respect to the filling operation, and by adjusting supporting cam 33 the time of tilting for the discharge of the filled bag can be adjusted with respect to the sewing operation.

The mechanism for supporting and manipulating the mouths of the bags, that is to say, for holding the bag mouths and opening them and closing them at the proper times, is illustrated in front view in Fig. 16, in horizontal section in Fig. 15, and details are illustrated in Figs. 17 to 25, inclusive. Some, though not all, of the parts of this mechanism are shown also in Figs. 1-4, inclusive. This mechanism comprises the rotary frame 4 which carries the devices for receiving and holding the mouths of the bags, and means comprising a set of circular cams, indicated generally by numeral 43, for actuating these bag-holding devices, all of which will be described in detail presently.

The rotary frame 4 comprises two ring-shaped members 44 and 45. Ring member 44 has an inwardly projecting annular rib upon which the teeth of internal gear 19 are cut (see Figs. 3, 10 and 17). This annular rib also serves to support ring member 44 and hence rotary frame 4 through its engagement with three flanged rollers 46. These rotate on vertical stub shafts which are secured by bolts 47 to a horizontal flange 48 of a stationary and generally circular support 49 which is integral with rectangular platform 12. Stationary support 49 and rectangular platform 12 are supported in fixed position upon column 1 by means of sleeves 50 and 51 (Fig. 3) which are clamped around this column.

The other ring-shaped member 45 of rotary frame 4 is secured to the lower rim of ring member 44 by suitable screws as illustrated in Figs. 3 and 19, and from the horizontal flange through which these screws pass this member extends downwardly in the form of a cylindrical apron against which the outer sides of the bags $B_1$ to $B_6$ shown in dotted lines in Fig. 15 are held by the bag-holding devices.

The bag-holding and mouth-manipulating devices for each of the bag positions $B_1$ to $B_6$, inclusive, are identical, and for each of these positions there are four bag-holding fingers $F_1$, $F_2$, $F_3$ and $F_4$. These fingers are all alike and are arranged to project downwardly into the mouth of the bag to engage the bag on the inside. They are preferably constructed in the form of rollers 52 illustrated in detail in Fig. 25 which are freely rotatable on a spindle 53, and each of these rollers has a pair of spaced knurled ribs 54 which frictionally engage the interstices of the fabric of which the bags are made in such a way as to effectively prevent the bags from slipping out of position. Two of these fingers $F_3$ and $F_4$ are mounted at the ends of arms 55 and 56 which are arranged to swing outwardly with respect to the rotary frame 4 and with respect to the other two fingers $F_1$ and $F_2$ so as to hold the bag in open position with the mouth of the bag stretched about these four fingers, each of the fingers engaging the inside of the mouth of the bag just below the top, as indicated in Figs. 1 and 17.

Arm 55 is supported on a bracket 57 to which it is attached by pivot 58 which permits the arm to swing horizontally from the dotted position shown in Fig. 22 to the full line position. In the dotted position the arm engages a spring finger 59, and in the outward position to which it is biased by means of a spring 60 it is stopped by the engagement of shoulder 61 with the surface of the bracket. Arm 56 is pivoted in a similar way at 62 to a bracket 63 and is biased towards its full line position by means of helical spring 64. A stop shoulder 65 on the arm engages the bracket to hold the arm in the desired outward position. Brackets 57 and 63 are bolted to ring member 44 of rotary frame 4 in pairs as shown in Fig. 15 so as to form the bag-holding positions indicated by reference numerals $B_1$ to $B_6$, inclusive, and as frame 4 rotates, all of the bag-holding devices are carried around with it.

The inner finger $F_2$ is mounted on the lower side of brackets 57 and inner finger $F_1$ is carried by bracket 63. $F_1$ is a take-up finger and is yieldably mounted as indicated in Figs. 22 and 24 in order to compensate for variation in the size of the bag mouths since bags of the same nominal size necessarily vary somewhat. Finger $F_1$ in Fig. 22 is in the position it occupies when a bag of a given size is in place. With a bag having a somewhat smaller mouth, finger $F_1$ will be shifted slightly to the right compressing spring 68. The yieldable mounting of this take-up finger comprises a block 66 which slides in a channel that extends horizontally of bracket 63, block 66 being urged to the left by spring 68.

When it is desired to change the mouth size of the bag which is to be handled by the machine, a different set of arms 55 and 56 is applied to rotary frame 4. Adjustment as to height is made as previously described.

Some bags are made with a single vertical seam at one side, and others have two seams, one at each side. It will be understood that in order to make a presentable package the bags must be so stitched that the seam, or seams, will be substantially straight with the sides of the bag, or, in the case of a two-seam bag, for example, it must be so stitched that the seams will be located substantially at the opposite ends of the line of stitching. For this reason when the operator places each bag in the machine a seam is placed adjacent take-up finger $F_1$. If the bag has two seams, the other seam will be located adjacent finger $F_3$ on arm 55. The operator holds the fourth corner of the bag with the hand temporarily, as indicated in Figs. 1 and 15, until arm 56 swings outwardly bringing finger $F_4$ into engagement with this corner of the bag, as the bag rotates from position $B_1$ to filling position $B_2$ as will presently be described.

It is important that the line of stitching which closes the mouth of the bag be parallel to the top of the bag, as shown in Fig. 21, and after the bag is filled with sugar, the weight of the sugar tends to make the center of the bag sag somewhat. This sagging tends to occur principally along the inner side of the bag between fingers $F_1$ and $F_2$, and in order to prevent such sagging, and also to prevent the bag from shifting its position after it has been properly placed on the holding fingers $F_1$ to $F_4$, a gripping device, indicated generally by numeral 69, is provided which is illustrated in detail in Figs. 18, 23 and 22. This comprises a finger 70 which is pivoted at 71 to a small supporting bracket 72 which is secured by screws shown in Fig. 23 to ring member 44 of the rotary frame 4 intermediate the brackets 57 and 63. At the lower end of this finger 70 there is a flat vertical face 73 at the center of which is a single protruding button 74. Face 73 and button 74 are adapted to engage the inner surface of the bag near the top and clamp it against the surface of apron member 45 in which there is a small aperture 75 into which the fabric is forced by the button 74 in order to get a better grip on the bag.

The three circular cams indicated generally by numeral 43 are provided to actuate and control the movement of the swinging arms 55 and 56 and the clamping finger 70. These three cams are supported in stationary position, one above the other, by means of suitable brackets attached to the stationary circular support 49. Cam 76, which is the uppermost of the three cams, controls clamping finger 70 by engaging a roller 77 at the upper end of this finger. This cam is also the shortest of the three and its extent is indicated in Fig. 10. While roller 77 is in contact with cam 76 the gripping finger is held out of engagement with and in spaced relation to apron member 45 so as to permit the bag to be inserted by the operator standing in front of the machine while each of the sets of bag-holding fingers passes the front of the machine at approximately the position indicated by reference numeral $B_1$ in Fig. 15.

Cam 78, which is the middle cam, is the longest of the three cams and engages roller 79 of arm 55 which supports the bag-holding finger $F_3$. Cam 80, the lowermost cam, cooperates with roller 81 on arm 56 which carries bag-holding finger $F_4$. The reference numerals have been applied to these cams at their opposite ends in Figs. 10 and 15 in order that the extent of each cam may be quickly seen.

The operator places the bags one at a time by hand at the position $B_1$ without stopping the machine; that is to say, the rotary frame 4 and bag-supporting platform 3 rotate continuously at moderately slow speed so that there is ample opportunity for the operator to place the mouth of the bag behind fingers $F_1$ and $F_2$ and around finger $F_3$ which, as indicated in Fig. 15, is now in its extended position. The operator then holds the fourth corner of the bag with a finger, as indicated at position $B_1$ and continues to hold the bag in this manner until roller 81 reaches the point 82 on cam 78 where arm 56 is permitted to move gradually outward. As this occurs, finger $F_4$ gradually moves out and engages the corner of the bag, and shortly before reaching the position $B_2$, roller 81 is released by the end of cam 78 and the bag is entirely supported by the four fingers F1 to F4.

At approximately the position B2 and continuing towards the position B3, the filling mechanism, indicated generally by numeral 83, operates to deliver a measured quantity of sugar into the hopper and spout 5. This hopper and spout 5 is arranged to travel with the bag which is being filled until the discharge of the material through spout 5 has been completed and the mechanism for moving the hopper will be described later on. The hopper is elongated as shown in Fig. 4 so as to permit the charge from the filling mechanism 83 to be received within the hopper during this movement.

At approximately the time when the charge commences to descend into the bag, the jolting of the bag to pack the sugar within it commences, this being accomplished as previously described by the coaction of cam 34 and roller 32 (Figs. 1, 7 and 8). Also before the closing of the bag commences and after the charge of sugar has been received in it, the bag is given a sidewise shaking movement by means of a pair of arms 84 having bag-engaging plates 85 at their lower ends for engaging the sides of the bag. The mechanism for actuating these shaking plates will be described presently.

After the charge of sugar within the bags has been shaken down solidly by the jolting and shaking movements, the closing of the bag commences by the substantially simultaneous engagement of rollers 79 and 81 by their actuating cams 80 and 78. These cams gradually turn arms 55 and 56 inwardly towards apron member 45 of rotary frame 4. This swings the outer bag-holding fingers F3 and F4 first substantially into the plane of fingers F1 and F2, as shown at the position B4 in Fig. 15, and then carries these fingers further inwardly until the opposite sides of the bag from seam to seam are brought against the outer surface of apron member 45 as shown in the position B5 in Figs. 15 and 21. The swinging movement of fingers F3 and F4 with respect to fingers F1 and F2 produces first a parallelogram figure when the mouth of the bag is viewed in top view and then brings the opposite sides of the bag into flat and smooth contact with one another. During this folding of the bag mouth, take-up finger F1 may shift slightly, and the operator soon learns about how close thereto the seam of the bag should be placed so that after this shifting has occurred the seam will be behind this finger; then the opposite side of the bag, or the opposite seam (if it is a two-seam bag) will be adjacent or behind finger F3 when the bag is folded into sewing position against apron member 45.

With the mouth of the bag in this position, it is carried past the sewing mechanism 6 and a line of stitching 86 is sewed a short distance from the top of the bag and close beneath the bottom edge of apron member 45. This is shown in Fig. 21, in which the sewing machine needle is indicated by reference numeral 87 at substantially the completion of the line of stitching 86. Just after the bag has moved from the position shown at the left in Fig. 21, the position B6, or in other words, after the completion of the stitching, the roller 79 passes beyond the end of cam 80 and arm 55 is released and flies out to the open position shown at bag position B1 in Fig. 15. At about the same time roller 77 is engaged by the upper cam 76 which releases the bag-holding finger 70 and the top of the bag is thus freed from rotary frame 4. At substantially the same time, the particular segment of platform 3 on which the bag is resting is tilted to position 7, Fig. 1 and Fig. 3, by the supporting roller 31 leaving the end of supporting cam 33 (Fig. 7). This causes the discharge of the filled and closed bag onto the conveyor 8.

The filling mechanism, shaking mechanism, sewing machine control mechanism and thread-cutting mechanism remain to be described. All of these mechanisms are actuated in whole or in part from slow speed shafts 88 and 88a which are held in alinement with one another by means of a sleeve 89 which is pinned to shaft 88a but which makes a loose fit with shaft 88. Shaft 88 is supported by a journal in worm gear housing 14 and is driven continuously by bevelled gearing 90 from slow speed vertical shaft 17. The outer end of shaft 88a is journaled in a bracket 91 mounted near the end of rectangular platform 12.

Shaft 88 rotates continuously and shaft 88a rotates with it so long as the clutch mechanism indicated generally by reference numeral 92 is in engagement. The construction of this clutch will be described below.

The filling mechanism 83 which is not illustrated in detail is driven by means of a chain 93 from a sprocket 94 keyed to shaft 88a. This filling mechanism is arranged to deliver a measured amount of the material to be packed for each complete revolution of shaft 88a. That is to say, for each revolution of shaft 88a the filling mechanism delivers a charge of sugar, for example, to the hopper and spout 5 sufficient to properly fill the bag beneath the spout. The clutch mechanism 92 is of the one-revolution type and comprises a disc 95 (Fig. 14) which is pinned to continuously rotating shaft 88 and which is provided with a single notch 96, together with an arm 97 which is integral with sleeve 89 which, as mentioned previously, is fixed to shaft 88a. On one side of arm 95 a dog 98 is pivoted, the head of which is arranged to engage notch 96 and hence drive arm 97 and shaft 88a. This dog is biased into engagement with this notch by a helical spring 99 and is provided with a tail portion 100, by means of which it is rotated about its pivot out of engagement with notch 96 when tail portion 100 strikes the upper surface of release member 101, which is mounted on a horizontal shaft 102 and arranged to be moved into the path of rotation of tail 100 by means of a lever 103 also fixed to shaft 102. Alongside of releasing member 101 is a back lash preventer 104 which is a hook shaped member adapted to engage the rear surface 105 of arm 97 just after dog 98 has been pushed out of engagement with notch 96. For this reason, back lash preventer 104 is yieldably mounted on shaft 102 as indicated by spring 106 and the pin and slot stop indicated by numeral 107.

Lever 103 is operated by foot pedal 108 shown in Fig. 4 and both are held normally in elevated position by means of a flat spring 109. Hence the clutch release member 101 and back lash preventer 104 are normally held out of the path of the rotating parts of the clutch as shown in Fig. 14.

It is intended that the rotary frame 4 and platform 3 shall rotate continuously and that the operator shall place bags upon the machine as each set of fingers F1 to F4, inclusive, reaches the position B1 (Fig. 15) at the front of the machine. In order, however, to prevent a charge of sugar from descending into spout 5 should it be impossible for the operator to properly attach a bag at any given time, it is provided that when the operator starts to place a bag upon the fingers at position B₁, the foot pedal 108 shall be depressed and held depressed until roller 81 has been released from cam 78 and arm 56 has swung out carrying finger F₄ into engagement with the bag mouth. At that time the operator releases foot pedal 108 and the clutch control members 101 and 104 return to their normal position shown in Fig. 14. During the time that the pedal is depressed, arm 97 will be rotating in the counterclockwise direction, as shown by the arrow, towards the clutch control members. However, before the tail 100 of dog 98 strikes the end of release member 101, the foot pedal and lever 103 will, under ordinary conditions, have been released by the operator and the control members moved back out of the path of the tail 100, so that the clutch remains in engaged position and the filling mechanism is operated to fill the bag. Should the operator not be able to place the bag properly on the fingers F₁ to F₄, the pedal 108 will be kept depressed, and this will disengage the clutch and prevent delivery of the load of sugar into spout 5.

The mechanism for shaking the bag sidewise is illustrated particularly in Fig. 11 and also in Figs. 4, 5 and several of the other figures. The operating cam 110 is secured to shaft 88ₐ and has a single projection which engages a roller 111 on an arm 112 which is fixed to a short rock shaft 113 supported in a bearing bracket 114. On the opposite end of this shaft is a cross arm 115 carrying at its opposite end the vertical arms 84 which carry at their lower ends the bag-shaking plates 85.

The mechanism for moving hopper and spout 5 to cause it to follow the moving bag is illustrated in Figs. 4, 1 and 13. The spout is supported upon a horizontal arm 116 which projects from a narrow sleeve 117 which can turn freely on column 1 but is held between fixed collars above and below.

An actuating cam 118 is fixed on shaft 88 and engages a roller 119 (Fig. 13) on a vertical arm 120 which is pivoted at its upper end to a bracket 121. A link 122 is pivoted to the lower end of arm 120 and at its opposite end to a stud 123 which projects downwardly from the side of arm 116. The roller 119 is held in contact with the surface of the cam 118 by means of a helical spring 124 shown in Fig. 4 which is connected between arm 116 and frame 49.

The sewing machine control is shown particularly in Figs. 4, 12 and 13 and also in Fig. 2. The sewing mechanism 6 is driven by means of a belt 125 from a driving pulley 126 which is secured to the end of a hollow shaft 127 which is journalled in a bearing bracket 128. The bore through the center of hollow shaft 127 is large enough so that shaft 11 passes through it without touching it. Keyed to shaft 11 close to one side of driving pulley 126 is a friction driving disc 129 and the side surface of pulley 126 is adapted to be shifted into frictional engagement with disc 129 to drive the pulley.

This shifting is accomplished by means of a grooved collar 130 mounted upon and preferably integral with the outer end of hollow shaft 127, this collar being engaged by forked arm 131 (Fig. 12) pivoted at 132 to a boss on rectangular platform 12. Forked arm 132 is urged by a helical spring 133 in a direction to move pulley 126 into engagement with friction disc 129, and these parts are normally held out of engagement by a latch 134 which engages a short pin 135 on the upper face of an extension 136 of the lower arm of the forked member 131.

Latch 134 is fixed to the upper end of a shaft 137 which extends downwardly through supporting platform 12 and at its lower end has an arm 138 yieldably secured thereto. A spring 139 surrounding shaft 137 biases latch 134 into engagement with pin 136.

Whenever a filled bag on rotating platform 3 approaches the sewing mechanism 6, it engages arm 138 and moves it outwardly, thus releasing latch 134 from pin 136 and permitting spring 133 to cause forked arm 131 to shift pulley 126 into engagement with friction disc 129, and since disc 129 rotates continuously this starts the sewing mechanism in operation. The sewing mechanism is maintained in operation until after the bag has passed the position B₆ of Fig. 21 whereupon it is desirable that the sewing mechanism be stopped. This is accomplished by moving forked arm 130 in the opposite direction to release driving pulley 126 from the rotating friction disc 129 and resetting pin 136 behind latch 134. This movement of forked arm 131 is effected by means of a face cam 140 which cooperates with a roller 141 (Figs. 4 and 13), this roller being mounted at the upper end of an arm 142 which is pivoted to platform 12. This arm is connected by means of a link 143 to forked arm 131.

The length of the line of stitching for a small bag, a five pound bag, for example, is obviously shorter than that for a ten pound bag, and it is desirable to stop the operation of the sewing machine as soon as the line of stitching has been completed. To adjust this point of termination of the operation of the sewing machine, face cam 140 is made adjustable. The cam is made of two interfitting cup-shaped members which may be shifted angularly relative to each other to vary the length of the dwell, or, in other words, to vary the point at which the hump on this cam engages roller 141 and shifts the clutch mechanism to disengaged position.

At the end of the sewing operation the thread is cut off by means of automatic cutting mechanism illustrated in Figs. 1, 4, 10 and 20. This mechanism comprises a rotary cutting disc 145 which is driven continuously by means of a belt 146 from a separate driving motor 147. Motor 147 is carried on a bracket 148 projecting from a collar fixed to column 1 and the rotary cutter 145 is mounted for rotation at the lower end of a supporting bar 149 which is pivoted on the motor shaft and hangs downward therefrom and is adapted to be swung back and forth so as to bring the rotary cutter into and out of engagement with the thread.

Simultaneously with the approach of the cutter to the thread from one side, a thread holding member 150 approaches the thread from the opposite side. This motion is accomplished by the parallelogram linkage 151 shown in Figs. 1 and 20. The thread-holding member 150 is adjustably mounted on the lower horizontal member 152 of this linkage, and the linkage is actuated by a horizontal link 153 pivotally connected to swinging arm 149.

The actuation of the thread-cutting mechanism to cut off the thread at the proper time is provided for by means of a cam 154 on the lower end of vertical slow-speed shaft 17 shown in Figs.

3 and 10. This cam engages a roller 155 on the end of a bell crank arm 156 which is pivoted at 157 on the machine frame. The bell crank at the other end is connected by means of a link 158 to the lower portion of swinging member 149. Shaft 17 rotates once for each bag delivered by the machine; consequently just prior to the delivery of the bag by the tilt of the segmental platform on which it rests at position 7 of Fig. 1, roller 155 moves over the step of cam 154, thus causing the thread cutter to operate to cut off the thread. Thereafter the thread cutter is gradually retracted so as to be in position to cut off the thread for the next bag.

It will be understood that the invention is not limited to the exact details shown in the accompanying drawings, but that changes may be made without departing from the spirit of the invention, the scope of which is set forth in the appended claims.

We claim:

1. In a machine of the class described, a supporting member having at least three flanged rollers mounted thereon to rotate about vertical axes, a bag mouth supporting frame having an internal ring portion engaging said flanged rollers to support the frame, a bag-supporting table, and means for rotating said frame and table in unison.

2. In a machine of the class described, bag mouth-supporting and manipulating mechanism comprising a circular frame having a plurality of bag positions and at each of said positions a pair of fingers adapted to project into the interior of the bag mouth mounted in spaced relation on said frame, a pair of arms, one pivoted to the frame adjacent each of said fingers, and each carrying at its outer end a bag mouth engaging finger, means for biasing said arms to swing outwardly from said frame so as to cause said fingers to hold the mouth of a bag stretched into open position for filling, means for rotating said frame, and cam members extending circumferentially along said frame to cause the arms at said respective bag positions to be swung adjacent said frame so as to close one side of the bag against its opposite side and thereafter permitting said arms again to swing outwardly to release the closed bag and permit the application of another bag to said fingers.

3. In a machine of the class described, bag mouth-supporting and manipulating mechanism comprising a circular frame having a plurality of bag positions, each of said positions having a pair of fingers adapted to project into the interior of the bag mouth mounted in spaced relation on said frame and a pair of bag mouth holding arms swingably mounted on the frame and biased to swing outwardly from said frame to aid said fingers in holding the bag mouth open, means for rotating said frame, and cam members extending circumferentially along said frame to coact with said arms to cause the said arms to be swung into position adjacent said frame to close the bag and said cams thereafter permitting said arms to swing outwardly to release the closed bag and permit the application of another bag to be held temporarily in open position.

4. In a machine of the class described, bag mouth-supporting and manipulating mechanism comprising a circular frame having a plurality of bag positions and at each of said positions a pair of fingers adapted to project into the interior of the bag mouth mounted in spaced relation on said frame, a pair of arms, one pivoted to the frame adjacent each of said fingers, and each carrying at its outer end a bag mouth engaging finger, means for biasing said arms to swing outwardly from said frame so as to cause said fingers to hold the mouth of a bag stretched into open position for filling, means for rotating said frame, cam members extending circumferentially along said frame to cause the arms at said respective bag positions to be swung adjacent said frame so as to close one side of the bag against its opposite side and thereafter permitting said arms again to swing outwardly to release the closed bag and permit the application of another bag to said fingers, and a yieldable mounting for one of said frame mounted fingers biasing said finger to compensate for variation in the size of the bags.

5. In a machine of the class described, bag mouth-supporting and manipulating mechanism for flat folded bags comprising a circular frame having a plurality of bag positions and at each of said positions a pair of fingers adapted to project into the interior of the bag mouth mounted in spaced relation on said frame, a pair of arms, one pivoted to the frame adjacent each of said fingers and each carrying at its outer end a bag mouth engaging finger, means for biasing said arms to swing outwardly from said frame so as to cause said fingers to hold the mouth of a bag stretched into open position for filling, means for rotating said frame, cam members extending circumferentially along said frame to cause the arms at said respective bag positions to be swung adjacent said frame so as to close one side of the bag against its opposite side from fold to fold and thereafter permitting said arms again to swing outwardly to release the closed bag and permit the application of another bag to said fingers, a yielding mounting for one of said frame mounted fingers biasing said finger to compensate for variation in the size of the bags, and means for preventing the shifting of the mouth of said bag on said fingers during said closing.

6. In a machine of the character described, a rotary frame, a device on said frame for receiving and holding the mouth of a bag, a rotary bag table below said frame for supporting the bottom of the bag, means for supporting said frame and bag table for rotary movement, means for rotating the frame and bag table at the same speed, said rotary bag table comprising a central support and a plurality of segments pivoted thereto, each of said segments having a downwardly directed arm, a pair of rollers, one larger than the other, mounted on each of said arms, a supporting cam cooperating with one of said rollers and a jolting cam cooperating with the other of said rollers, and means for adjustably mounting said cams in fixed position.

7. In a machine of the class described, a stationary central supporting column, a bag mouth-holding frame carried by said column and rotatable concentrically with respect thereto, a sleeve member mounted for rotation on said column, a bag-supporting platform rotatably mounted on the column below said sleeve member, mechanism for rotating said frame and sleeve member in unison and a pair of vertical rods extending downwardly from said sleeve member, said bag-supporting platform having apertures to receive said rods in slidable relation therewith, and elevating and lowering mechanism for adjusting the height of the bag-supporting platform on said column to accommodate bags of different height.

8. In a machine of the class described, a stationary central supporting column, a bag-mouth-holding frame carried by said column and rotatable concentrically with respect thereto, a sleeve member mounted for rotation on said column, a bag-supporting platform rotatably mounted on the column below said sleeve member, mechanism for rotating said frame and sleeve member in unison, a pair of vertical rods extending downwardly from said sleeve member, said bag-supporting platform having apertures to receive said rods in slidable relation therewith, elevating and lowering mechanism for adjusting the height of the bag-supporting platform on said column to accommodate bags of different height, and a positioning member for the sides of the bags mounted on said rods.

9. In a machine of the character described, a rotary frame, a device on said frame for receiving and holding the mouth of a bag, a rotary bag table below said frame for supporting the bottom of the bag, means for supporting said frame and bag table for rotary movement, means for rotating the frame and bag table at the same speed, said rotary bag table comprising a central support and a plurality of segments pivoted thereto, each of said segments having a downwardly directed arm, a supporting cam and a jolting cam cooperating with said arms, and means for adjustably mounting said cams in fixed position.

10. In a machine of the class described, bag-mouth-supporting and manipulating mechanism comprising a frame having a plurality of bag positions, means for supporting said frame for rotary movement, each of said bag positions having a pair of fingers adapted to project into the mouth of a bag to engage the interior thereof and mounted in spaced relation on said frame, a pair of arms pivoted to the frame in spaced relation at each of said bag positions, each of said arms having a similar mouth-engaging finger to cooperate with the fingers on the frame in holding the bag, means for rotating said frame, means for swinging said pivoted arms outwardly from said frame to cause the mouth of the bag to be stretched and held in open position, and means for swinging said arms inwardly to move the bag-holding fingers thereof into position adjacent said frame to close the bag.

11. In a machine of the class described, bag-mouth-supporting and manipulating mechanism comprising a frame having a plurality of bag positions, means for supporting said frame for rotary movement, each of said bag positions having a pair of downwardly directed bag-mouth-engaging fingers mounted in spaced relation on said frame, a pair of arms pivoted to the frame in spaced relation at each of said bag positions, each of said arms having a downwardly directed bag-mouth-engaging finger, the fingers on said arms and frame cooperating in holding the mouth of a bag, means for rotating said frame, means for swinging said pivoted arms outwardly from said frame to cause the mouth of the bag to be stretched and held in open position, and means for swinging said arms inwardly to close the bag.

12. In a machine of the class described, bag-mouth-supporting and manipulating mechanism comprising a frame having a plurality of bag positions, means for supporting said frame for rotary movement, each of said bag positions having a pair of fingers on the frame adapted to project into the mouth of a bag to engage the interior thereof and mounted in spaced relation on said frame, a pair of arms pivoted to the frame in spaced relation at each of said bag positions, each of said arms having a similar mouth engaging finger for engaging the mouth of the bag on the interior thereof, the fingers on said arms and frame cooperating in holding the mouth of the bag, the bag being positioned with a side seam thereof adjacent one of the fingers on the frame, means for swinging said pivoted arms outwardly from said frame to cause the mouth of the bag to be stretched and held in open position, means for swinging said arms inwardly to move the bag-holding fingers thereof into position adjacent said frame to close the bag, the surface of said bag shifting on the fingers of said arms during the swinging movement thereof, and clamping means for engaging the bag to prevent the shifting of the side seam thereof away from the finger adjacent which it is placed.

13. In a machine of the class described, bag-mouth-supporting and manipulating mechanism comprising a frame having a plurality of bag positions, means for supporting said frame for rotary movement, each of said bag positions having a pair of fingers on the frame adapted to engage the mouth of a bag on the interior thereof and mounted in spaced relation on said frame, a pair of arms pivoted to the frame in spaced relation at each of said bag positions, each of said arms having a finger for similarly engaging the mouth of the bag on the interior thereof, the fingers on said arms and frame cooperating in holding the mouth of the bag, the bag being positioned with a side seam thereof adjacent one of the fingers on the frame, means for swinging said pivoted arms outwardly from said frame to cause the mouth of the bag to be stretched and held in open position, means for swinging said arms inwardly to move the bag-holding fingers thereof into position adjacent said frame to close the bag, the surface of said bag shifting on the fingers of said arms during the swinging movement thereof, and clamping means between the fingers on said frame for engaging the mouth of the bag therebetween to prevent the shifting of the side seam of the bag away from the finger on said frame adjacent which it is placed.

14. In a machine of the class described, bag-mouth-supporting and manipulating mechanism comprising a frame having a plurality of bag positions, means for supporting said frame for rotary movement, each of said bag positions having a pair of fingers on the frame adapted to engage the mouth of a bag on the interior thereof and mounted in spaced relation on said frame, a pair of arms pivoted to the frame in spaced relation at each of said bag positions, each of said arms having a finger for engaging the mouth of the bag on the interior thereof, the fingers on said arms and frame cooperating in holding the mouth of the bag, the bag being positioned with a side seam thereof adjacent one of the fingers on the frame, means for swinging said pivoted arms outwardly from said frame to cause the mouth of the bag to be stretched and held in open position, means for swinging said arms inwardly to move the bag-holding fingers thereof into position adjacent said frame to close the bag, the surface of said bag shifting on the fingers of said arms during the swinging movement thereof, a clamping finger pivoted on said frame between the bag-holding fingers thereon, and means for actuating said clamping finger to clamp the margin of the bag to prevent the shifting of the bag side seam away from the finger adjacent which it is placed.

15. In a machine of the class described, a supporting member having at least three flanged rollers thereon positioned in spaced relation in a circular path and mounted to rotate about vertical axes, a bag mouth supporting frame having an internal ring portion engaging said flanged rollers to support the frame for rotary movement, a rotary bag table below said frame for supporting the bottom of the bag, means for supporting said table for rotary movement, and means for rotating said frame and table in unison.

16. In a machine of the character described, a rotary frame, a device on said frame for receiving and holding the mouth of a bag, a rotary bag table below said frame for supporting the bottom of the bag, means for supporting said frame and bag table for rotary movement and mechanism for rotating the frame and bag table at the same speed, said rotary bag table comprising a central support and a plurality of segments pivoted thereto, each of said segments having a downwardly directed arm, a jolting cam cooperating with said arm, and means for mounting said cam in fixed position.

WALLACE D. KIMBALL.
MALCOLM McFAULL.
CORNELIUS I. BRAREN.